UNITED STATES PATENT OFFICE.

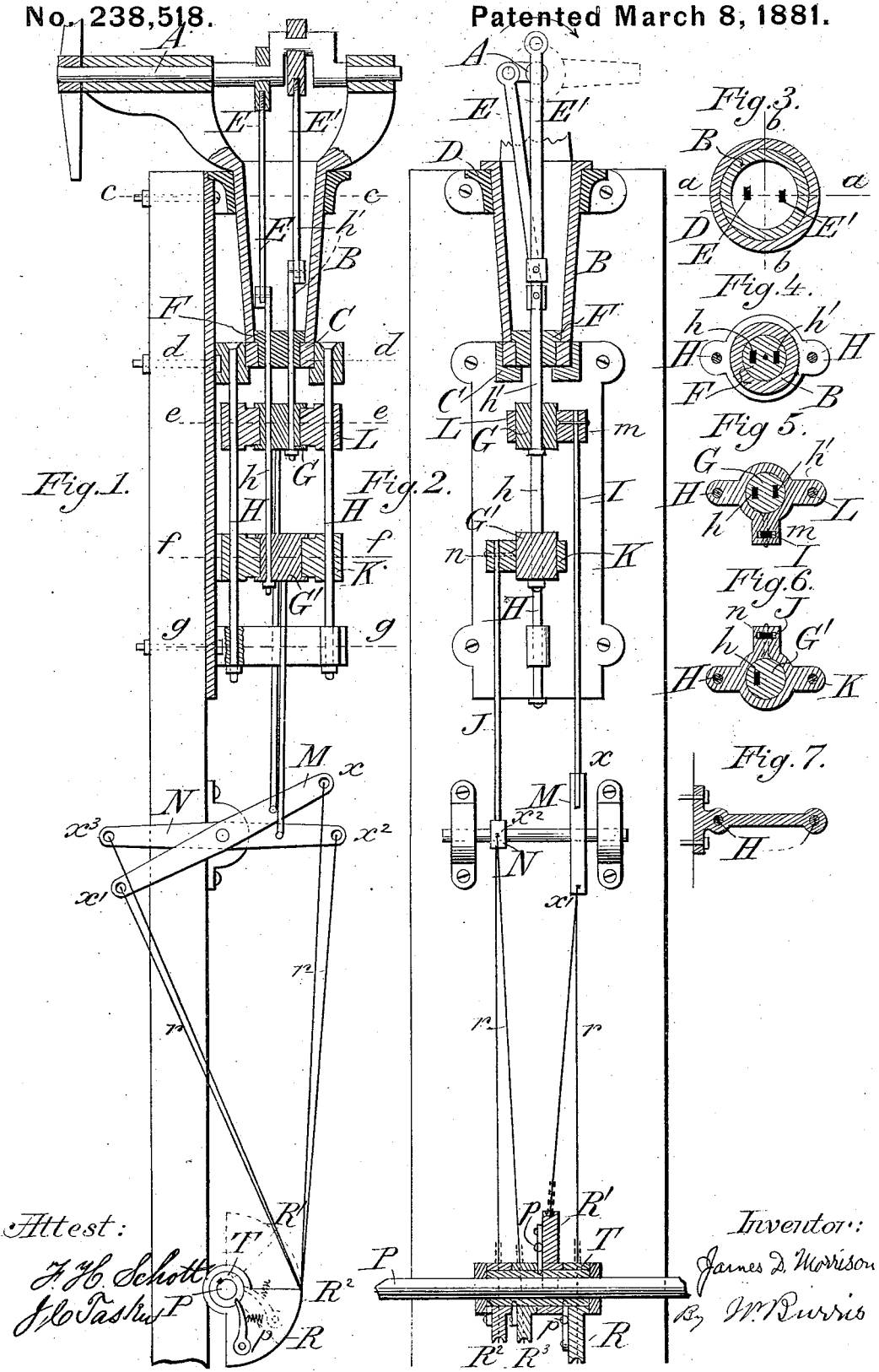

JAMES D. MORRISON, OF BRYANT, IOWA.

MECHANISM FOR TRANSMISSION OF POWER AND IMPARTING MOTION.

SPECIFICATION forming part of Letters Patent No. 238,518, dated March 8, 1881.

Application filed September 22, 1880. (No model.)

*To all whom it may concern:*

Be it known that I, JAMES DOUGLASS MORRISON, of Bryant, in the county of Clinton and State of Iowa, have invented certain new and useful Improvements in Mechanism for Transmission of Power and Imparting Motion; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to mechanism for the transmission of power and imparting motion. Its object is to so construct the mechanism and adjust its parts relatively that a shaft turning in a horizontal plane, like the main or driving shaft of a windmill, will impart a rotary motion to a stationary horizontal shaft.

In the accompanying drawings, Figure 1 is a vertical central section on the line $a\ a$ of Fig. 3. Fig. 2 is a vertical section on line $b\ b$ of Fig. 3. Fig. 3 is a transverse section at $c\ c$, Fig. 1. Fig. 4 is a transverse section at $d\ d$, Fig. 1. Fig. 5 is a transverse section at $e\ e$, Fig. 1. Fig. 6 is a transverse section at $f\ f$, Fig. 1. Fig. 7 is a transverse section at $g\ g$, Fig. 1.

Referring to the drawings, A designates a compound crank-shaft, having bearings in boxes on the tapering sleeve B, which rests in the step C and rotates therein, the collar D serving to hold the sleeve in position. The shaft A has cranks, as shown, for the pitmen E and E', the cranks being so constructed that one is a quarter of a stroke in advance of the other, as seen in Fig. 2, the pitman E' being at its highest point and the pitman E being shown a quarter of a stroke therefrom. These pitmen are connected with rods $h$ and $h'$, which are rectangular in section, and pass loosely through apertures in guide-piece F, secured within sleeve B and rotating with it. The rod $h'$ is rigidly attached to the swivel-block G, and the rod $h$ passes loosely through an aperture in block G down to swivel-block G', to which it is rigidly attached. The two swivel-blocks are severally held by the cross-heads L and K, and turn easily within them, the cross-heads moving on the guide-rods H fixed to the supporting-plate, as shown. A projection, $m$, is formed on the cross-head L, to hold one end of a rod, I, secured thereto, and a projection, $n$, is formed on cross-head K, to hold one end of a rod, J, these projections extending in opposite directions, as seen in Fig. 2. The rod I connects the cross-head L with the walking-beam M, and the rod J connects the cross-head K with the walking-beam N, the two beams being on the same shaft, as shown. When the cross-head L, from its connection with crank-shaft A, is at its highest point, the walking-beam M is at its full stroke, while the walking-beam N, connected with cross-head K, is at half-stroke, the relative positions being indicated in Fig. 1.

P represents a horizontal shaft, on which, and keyed thereto, is the sleeve T, said sleeve being provided with four notches or ratchet-teeth, located, with reference to the periphery, ninety degrees apart.

Fitted loosely on the sleeve T are four quadrant-levers, R, R', R², and R³, having collars to hold them in position, each of said levers being provided with a pawl actuated by a spring, $p$, and being so arranged that the pawl enters one of the notches on the sleeve T and causes the shaft to rotate when the levers are operated. The quadrant-levers are connected with the walking-beams by means of rods $r$, terminating in chains at their lower extremities. Quadrant-lever R is connected at $x'$ to to a walking-beam, M, the other end, $x$, being connected to lever R'. The end $x^2$ of beam N is connected with lever R², and rises as the other end, connected with lever R³, is descending.

It will be seen that as crank-shaft A moves around in a horizontal plane the swivel-blocks G and G' are made to rotate with it by means of the rectangular rods $h$ and $h'$, the cross-heads L and K being kept from turning by the guides H; but when the shaft A and cranks are rotated vertically a reciprocating motion is communicated to the cross-heads, and from them, by means of the rods I and J, to the walking-beams M and N, which, in turn, impart motion, by means of the rods $r$, to the quadrant-levers, each of which, by means of the pawl that engages in the notched sleeve T, turns the horizontal shaft P a distance of ninety degrees, thus causing it to revolve with the same speed as the crank-shaft A.

Having described my invention, I claim and desire to secure by Letters Patent—

1. In mechanism for transmitting motion, the combination of the driving-shaft A, the pitmen E E', swivels G G', guide-rods H, cross-heads K L, walking-beams M N, and connecting-rods $h$, $h'$, I, and J, substantially as and for the purposes described.

2. In a device for transmitting motion, the combination of the shaft P, provided with sleeve T, four quadrant-levers provided with pawls and connecting with the walking-beams, substantially as set forth.

In testimony that I claim the foregoing as my own I affix hereto my signature in presence of two witnesses.

JAMES DOUGLASS MORRISON.

Witnesses:
W. W. SANBORN,
W. F. COAN.